US008284235B2

(12) United States Patent
Held et al.

(10) Patent No.: US 8,284,235 B2
(45) Date of Patent: Oct. 9, 2012

(54) REDUCTION OF VIEWER DISCOMFORT FOR STEREOSCOPIC IMAGES

(75) Inventors: Robert Thomas Held, El Cerrito, CA (US); Chang Yuan, Vancouver, WA (US); Scott J. Daly, Kalama, WA (US); Hao Pan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 455 days.

(21) Appl. No.: 12/586,760

(22) Filed: Sep. 28, 2009

(65) Prior Publication Data
US 2011/0074933 A1 Mar. 31, 2011

(51) Int. Cl.
*H04N 13/00* (2006.01)

(52) U.S. Cl. ............ 348/42; 348/51; 382/154; 359/458; 359/462; 359/466

(58) Field of Classification Search ............ 348/42, 348/51; 382/154; 359/458, 462, 466
See application file for complete search history.

(56) References Cited

U.S. PATENT DOCUMENTS

| 4,647,965 | A | | 3/1987 | Imsand | |
| 5,719,954 | A | | 2/1998 | Onda | |
| 5,867,591 | A | | 2/1999 | Onda | |
| 6,067,192 | A | * | 5/2000 | Lichtenfield et al. | 359/480 |
| 6,069,192 | A | * | 5/2000 | Shalaby et al. | 523/205 |
| 6,110,588 | A | * | 8/2000 | Perez et al. | 428/359 |
| 6,175,379 | B1 | * | 1/2001 | Uomori et al. | 348/47 |
| 7,236,622 | B2 | | 6/2007 | Chen et al. | |
| 7,396,127 | B2 | | 7/2008 | Bae et al. | |
| 8,094,927 | B2 | * | 1/2012 | Jin et al. | 382/154 |
| 2004/0057612 | A1 | | 3/2004 | Tabata | |
| 2005/0195478 | A1 | * | 9/2005 | Yanagawa et al. | 359/462 |
| 2006/0126919 | A1 | | 6/2006 | Kitaura et al. | |
| 2007/0081716 | A1 | | 4/2007 | Ha et al. | |
| 2007/0139612 | A1 | | 6/2007 | Butler-Smith et al. | |
| 2007/0248260 | A1 | | 10/2007 | Pockett et al. | |
| 2008/0112616 | A1 | | 5/2008 | Koo et al. | |
| 2009/0040295 | A1 | | 2/2009 | Koo et al. | |
| 2009/0096863 | A1 | | 4/2009 | Kim et al. | |

OTHER PUBLICATIONS

Percival, A.S., *The Prescribing of Spectacles*, Bristol: John Wright & Sons, Ltd., (1928), p. 118-129 and 130-137.
Held, R.T. and Banks, M.S., "Misperceptions in Stereoscopic Displays: A Vision Science Perspective", The Association for Computing Machinery, Inc., (2008), pp. 23-31.
Ogle, K.N. and Schwartz, J.T., "Depth of Focus of the Human Eye", Journal of the Optical Society of America, vol. 49, No. 3, (Mar. 1929), pp. 273-279 and 208.
Hoffman, D.M., et al., "Vergence-Accomodation Conflicts Hinder Visual Performance and Cause Visual Fatigue", Jouran of Vision, (2008) 8(3):33, pp. 1-30. <journalofvision.org/8/3/33/>.

* cited by examiner

*Primary Examiner* — Phuoc Nguyen
(74) *Attorney, Agent, or Firm* — Chernoff Vilhauer McClung & Stenzel

(57) ABSTRACT

A method for modifying images for display on a three dimensional display includes receiving a first image and a corresponding second image which together represent a three dimensional image when displayed on the three dimensional display. Based upon the first and second image, the method determines whether their content is expected to cause substantial discomfort to a viewer when displayed on the three dimensional display. At least one of the first and second images are modified based at least in part on a physical value related to the pixel pitch of the display, in such a manner to reduce the expected discomfort to the viewer.

23 Claims, 9 Drawing Sheets

REDUCTION OF VIEWER DISCOMFORT FOR STEREOSCOPIC IMAGES

CROSS-REFERENCE TO RELATED APPLICATIONS

Not applicable.

BACKGROUND OF THE INVENTION

The present invention relates generally to displaying stereoscopic content on a display.

A liquid crystal display has a plurality of pixels each of which consists of a layer of molecules aligned between two transparent electrodes, and two polarizing filters where the axes of transmission are (in most of the cases) perpendicular to each other. The liquid crystal material twists with the application of an electric field across the two transparent electrodes, which controls the effect on the polarization of light passing through the liquid crystal material. Thus, with the two polarizing filters and controlling the amount of change in the polarization of the light, the amount of light allowed to pass through may be varied. Other types of displays include different technologies.

When displaying two-dimensional content on a two-dimensional liquid crystal display, the angle between the eyes of the viewer converge at the plane of the display. Also, when displaying two-dimensional content on a two-dimensional liquid crystal display, the eyes are focused on the plane of the display (i.e., accommodative). In this manner, the vergence and accommodative states are tightly coupled to one another. The eyes are not generally strained when the vergence and the accommodative states are tightly coupled.

One of the principal causes of observer fatigue and discomfort while viewing stereoscopic displays is due to a vergence-accommodation conflict. Vergence may be defined as the angle between the eyes' lines of sight, or optical axes. When one fixates on an object very far away, the lines of sight are nearly parallel, resulting in a very small vergence angle. When fixation is on a near object, the lines of sight converge and the vergence angle becomes large. Accommodation refers to the distance to which the eyes are focused, typically on the plane of the display. In natural viewing, the eyes' vergence and accommodative states are tightly coupled. However, this coupling is broken when one views a stereoscopic display, as seen in movie theaters and at home.

Referring to FIG. 1, with stereoscopic displays, the observer's eyes verge to various depths throughout the depicted scene while maintaining accommodation to the surface of the display. The conflict occurs because accommodation is driven by two signals—vergence and blur. If accommodation followed the vergence signal while viewing a stereo display, then in many cases the eyes would be focused to a different distance than the display, and the images would be blurred. So the observer's visual system switches to relying on the blur signal to control accommodation, ignoring the signal from vergence. This decoupling is a significant source of discomfort with stereo displays, resulting in headaches, eyestrain, and sometimes nausea.

What is desired, therefore, is a display system that reduces the discomfort when displaying stereo content.

DETAILED DESCRIPTION OF PREFERRED EMBODIMENT

To reduce eye discomfort, it is preferable to maintain the contents of a stereoscopic scene within a range of depths that would result in a reduced conflict between vergence and accommodation. This range is preferably the depth of focus of the eye, which may be around 0.66 (±0.33) diopters (from −0.33 to +0.33 range) or other suitable values. Accommodation throughout this range of depths would not result in significant detectable blurring of images. Then the blur and vergence signals to accommodation would not be in as much conflict with each other, thus reducing viewer discomfort. This range of depths may be referred to as Percival's zone of comfort (PZC) as determined by the Percival's criterion of comfortable binocular vision. In general, the zone of comfort describes fatigue, eyestrain, and/or discomfort.

In the stereo-cinema industry, general practice in the production of stereo content is moving towards a slight reduction of the conditions that cause the vergence-accommodation conflict. For instance, many studios are taking a "window-into-a-world" approach to stereo cinema, where all of the three dimensional content is placed beyond the plane of the display. This is beneficial because PZC extends further behind the display (away from the observer) than in front of it. However, some of the scenes that are considered to look the most "impressive" in stereo movies occur when objects point out from the screen toward the observer, possibly extending outside the PZC.

Figure 1:
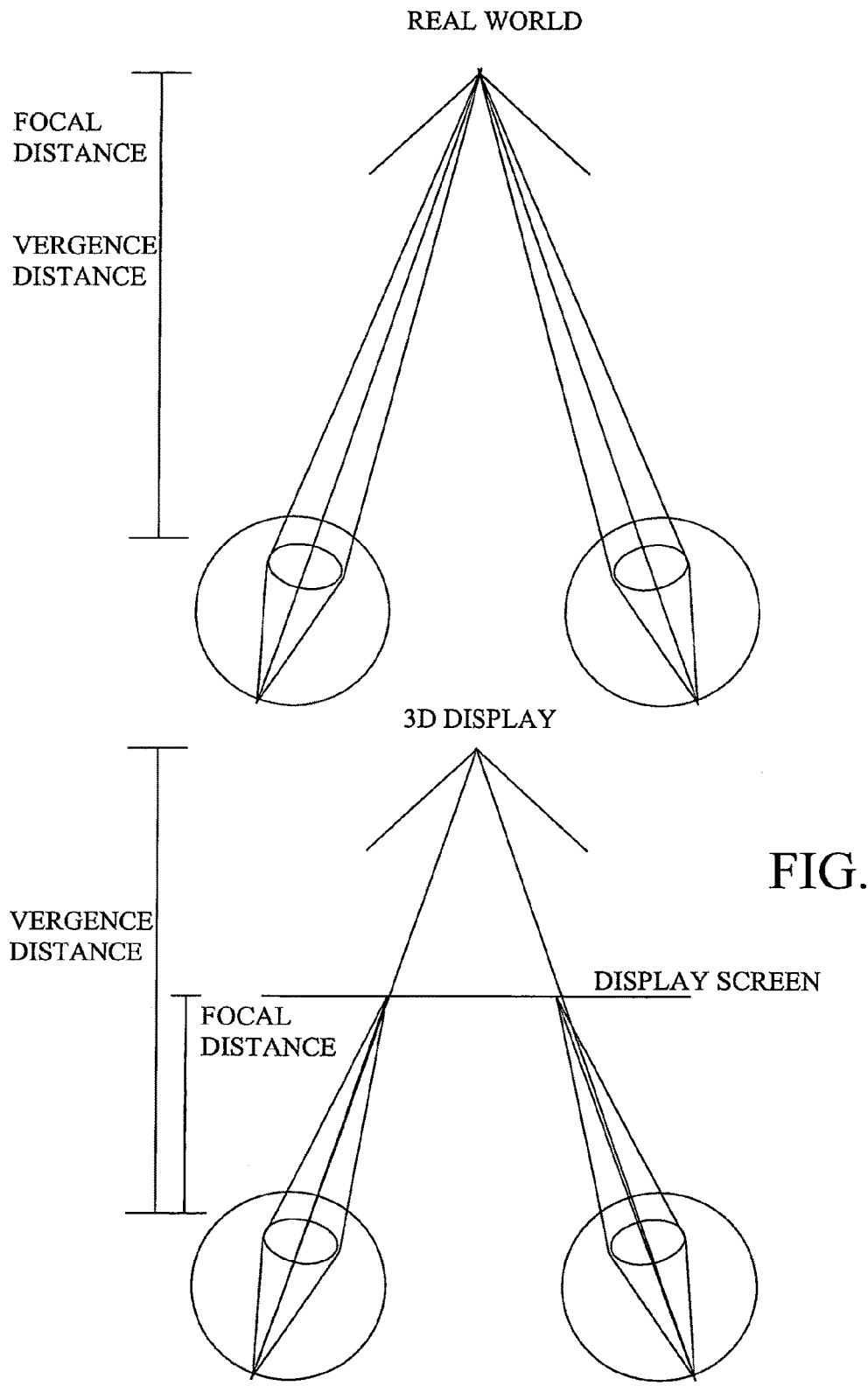
FIG. 1 illustrates vergence and focal distance.
Figure 2:
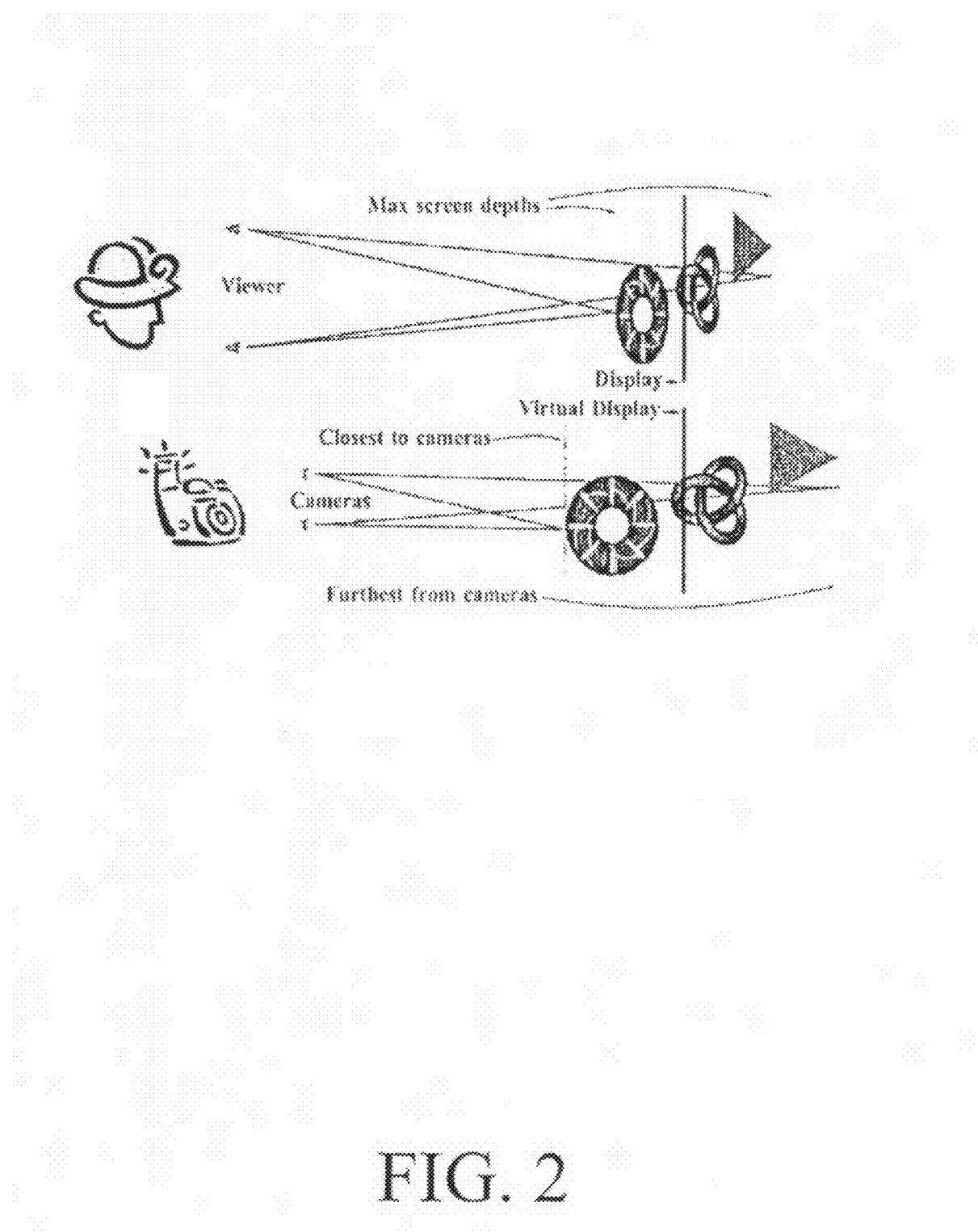
FIG. 2 illustrates suitable three dimensional content.

Referring to FIG. 2, predictions may be made on whether a given set of stereoscopic content is expected to cause fatigue. Such predictions depend heavily on the display parameters and viewing situation, making it difficult for content providers to produce material that is guaranteed not to cause discomfort. To more accurately reduce viewer fatigue, the content may be post-processed to account for specific display specifications and viewing situations.

Figure 3A:
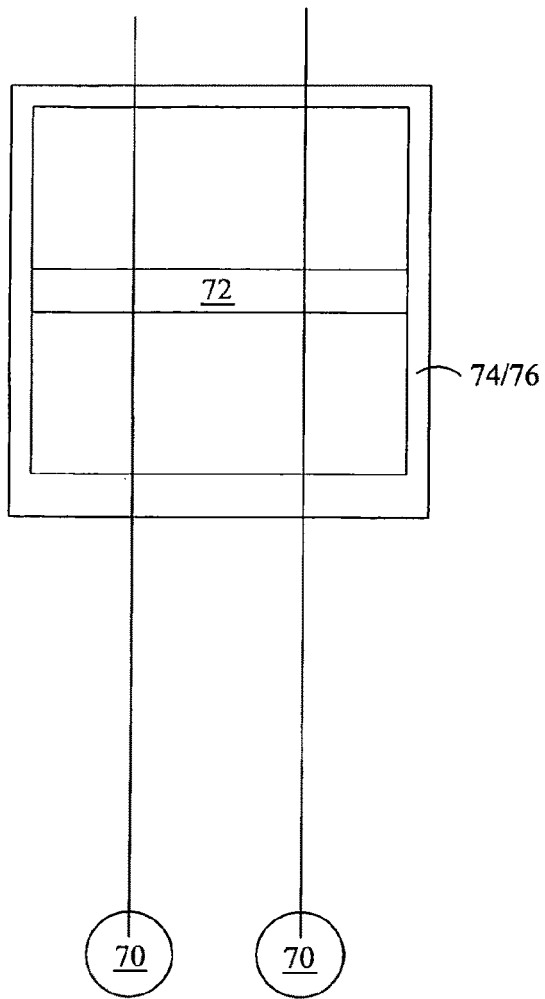
FIGS. 3A and 3B illustrate image offsets.
Figure 3B:
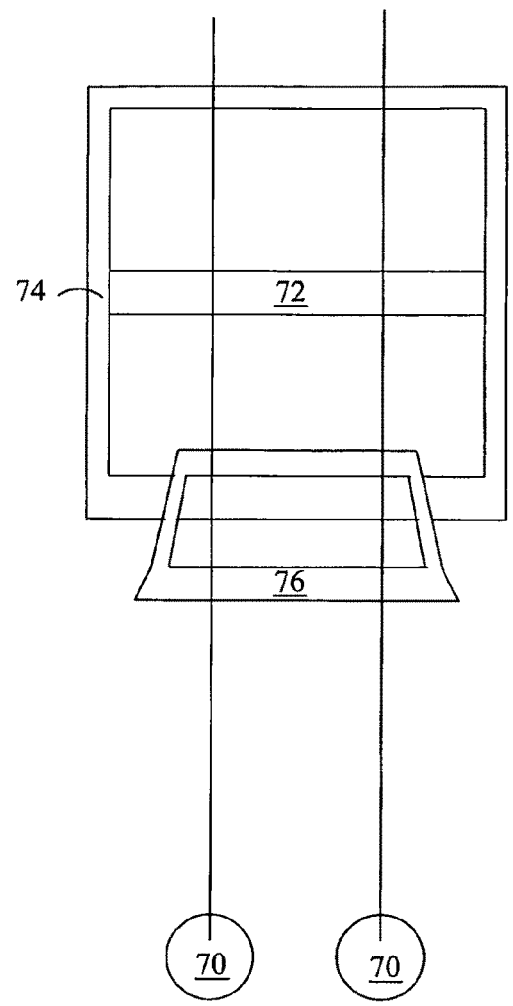

A variety of image capture, display, and viewing parameters may affect the perception of stereoscopic content. Referring to FIG. 3A and FIG. 3B, in addition lateral separation between the left and right images may also affect the perception of stereoscopic content. The eyes 70 represent an example of the viewer, the horizontal line 72 represents the display surface, the box 74 is the intended stimuli, and the tilted box 76 the predicted misperceived stimulus. In FIG. 3A, all display parameters are proper and the intended stimulus and perceived stimulus are identical. In FIG. 3B, the left image has been moved to the right and the right image has been moved to the left, causing a compression of the perceived stimulus.

Rather than attempting to require content providers to provide suitable content, it is desirable to use post-processing techniques to minimize viewer discomfort caused by stereoscopic displays. This may be accomplished by first evaluating the disparities in the depicted scene to determine whether they are expected to cause discomfort. If discomfort is expected, the stereo images may be modified. In one technique, the two images are laterally displaced in order to modify the presented disparities. In another technique, a new disparity map is produced and used with one of the images, and used to synthesize the other image. The modified images are then presented to the viewer, with a significantly reduced likelihood of discomfort.

Figure 4:
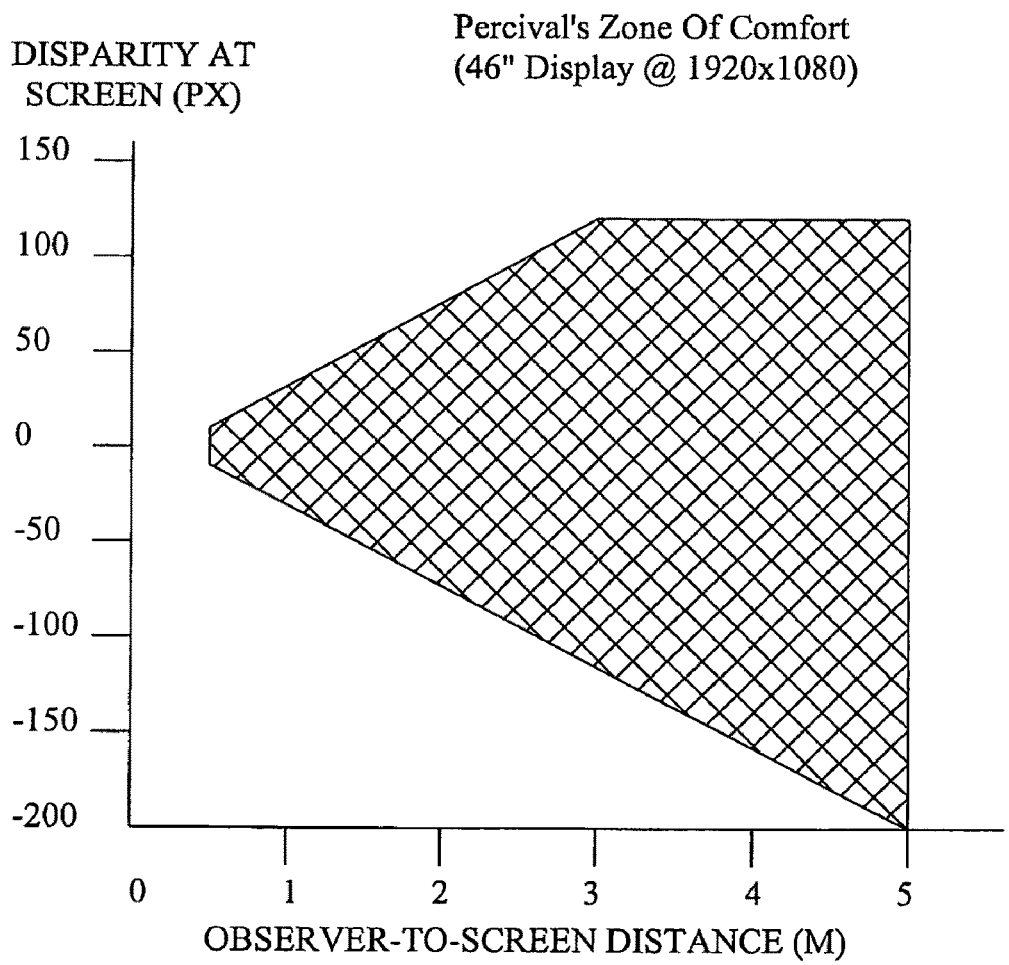
FIG. 4 illustrates a zone of comfort.

Referring to FIG. 4, the abscissa represents the distance between the viewer and the display. The ordinate represents disparities in units of on-screen pixels. The central zone represents disparities that lie within PZC and are therefore not expected to produce substantial discomfort. Accordingly, fixation on objects throughout the PZC are not expected to produce substantial conflicts between the blur and vergence signals that are used to control accommodation. That's because accommodation to any object within the zone should not make any other object within the zone appear significantly blurry. In other words, all of the objects will be generally within the eyes' depth of focus, so they should all appear to be generally sharp. It is convenient to consider the human threshold for blur detection in units of diopters, or inverse meters. This convention is because the difference in blur magnitude between two objects is directly proportional to the difference between their dioptric distances from the observer. In other words, if object A is at X meters from the observer and object B is at Y meters from the observer, then the difference in blur between A and B would be proportional to |1/X−1/Y|. For the plot in FIG. 4, the human blur threshold is assumed to be 0.33 diopters. The disparities corresponding to that dioptric distance may be calculated for each value along the abscissa to produce the plot. Additionally, the zone has a cut-off in the upper-right-hand portion. This exists because disparities larger than the distance between the viewer's eyes are hard, if not impossible, to fuse and therefore cause significant discomfort for a different reason. The cut-off at the left end of the zone is due to the closest distance to which the human eye can readily accommodate. In addition, there is typically a boundary at the left hand side of the zone also.

Figure 5:
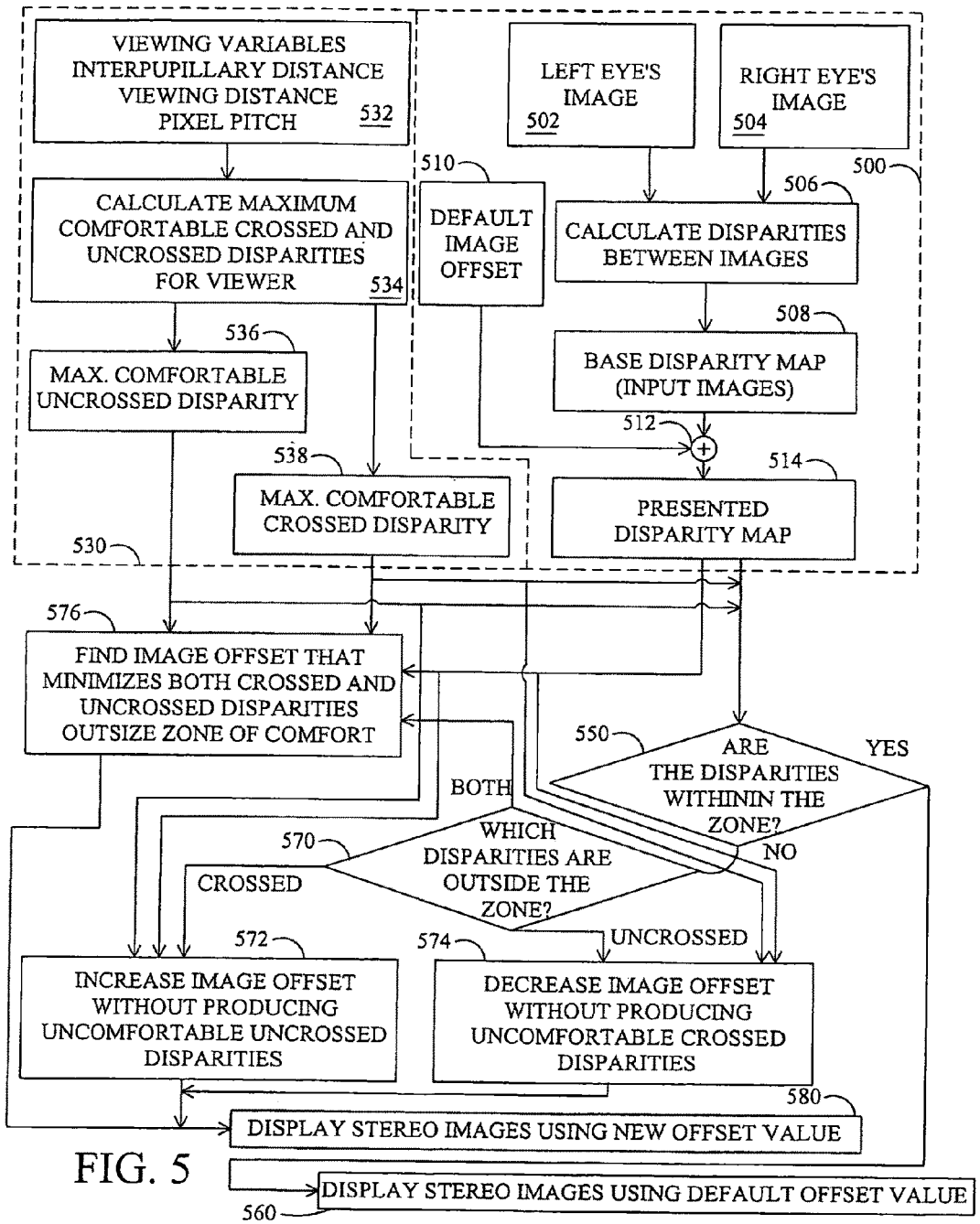
FIG. 5 illustrates an image offset based disparity correction.

Referring to FIG. 5, when one loads a set of stereo images onto a stereo display, ideally all of the disparities will lie within PZC. Unfortunately that is often not the case, and viewer discomfort arises. This problem may be remedied by modifying the display of stereo images to restrict the disparities within the PZC. FIG. 5 illustrates one disparity correction technique using image offset.

An image disparity determination 500 calculates data that may be used, at least in part, to determine whether a pair of images will result in discomfort to the viewer. In particular the image disparity determination 500 receives the image for the left eye 502 and the image for the right eye 504. Based upon the left eye image 502 and the right eye image 504 the image disparity determination 500 calculates the disparities 506 between the two images. The disparities 506 preferably reflect spatial shifts of the pixels in the image space. The disparities 506 are aggregated together to form a base disparity map 508, preferably representing spatial shifts of each of the pixels in the image space. In some cases, it is desirable to include a global offset. A default image offset 510 may be used to shift 512 the values of the spatial shifts by a uniform amount. The offset 510 is preferably applied to all of the pixels of the image, and at least a majority of the pixels. The result of the base disparity map 508 and the default image offset 510 is a presented disparity map 514. In some cases, it is desirable to do the disparity on a region by region basis, or otherwise on the basis of a group of pixels. In addition, the default image offset 510 may be a user selectable value, preferably through the user interface on the display.

A viewing variable determination 530 calculates the maximum disparity ranges. A set of viewer variables 532 may be input to the viewing variable determination 530. The viewer variables 532 may include, for example, the interpupillary distance (center-to-center of the eyes), the viewing distance from the display, and/or pixel pitch of the display (physical parameter of the display). The viewer variables 532 may be user selectable, preferably through the user interface on the display. One or more of the viewer variables 532 may likewise be adjusted by the system designer to accommodate anticipated viewing conditions. Based upon the viewer variables 532 a maximum comfortable crossed and uncrossed disparities 534 are calculated for the viewer. The crossed disparities are those that make both eye sights cross at each other in front of the display, causing the object to appear in front of the display. The uncrossed disparities are those that make both eye sights uncrossed in front of the display and cross behind the display instead, causing the object to appear behind the display. The maximum comfortable values 534 are provided to a maximum uncrossed disparity 536 and a maximum comfortable crossed disparity 538. In general, it is to be understood the disparities may be any distance, angular, pixel, or otherwise physical criteria.

Based upon the presented disparity map 514, the maximum comfortable uncrossed disparity 536, and the maximum comfortable crossed disparity 638, the disparities may be determined if within a zone of comfort 550. The preferred zone is the Percival Zone Of Comfort (PZC). If the disparities are within the zone of comfort 550 then the display displays the stereo images using default offset values 560.

If the disparities are not within the zone of comfort 550, then the system determines which are outside of the zone 570. If the crossed disparities are substantially outside the zone 570, then the system increases the image offset without producing substantial uncomfortable uncrossed disparities 572. Increasing the offset may be done by moving the left image to the left and the right image to the right. If the uncrossed disparities are substantially outside the zone 570, then the system decreases the image offset without producing substantial uncomfortable crossed disparities 574. Decreasing the offset may be done by moving the left image to the right and the right image to the left. If both the crossed disparities and uncrossed disparities are substantially outside the zone 570, then the system finds an image offset that reduces both crossed and uncrossed disparities outsize the comfort zone 576. The result of offset 572, 574, or 576 is displayed on the display using the new offset value 580.

Figure 6:
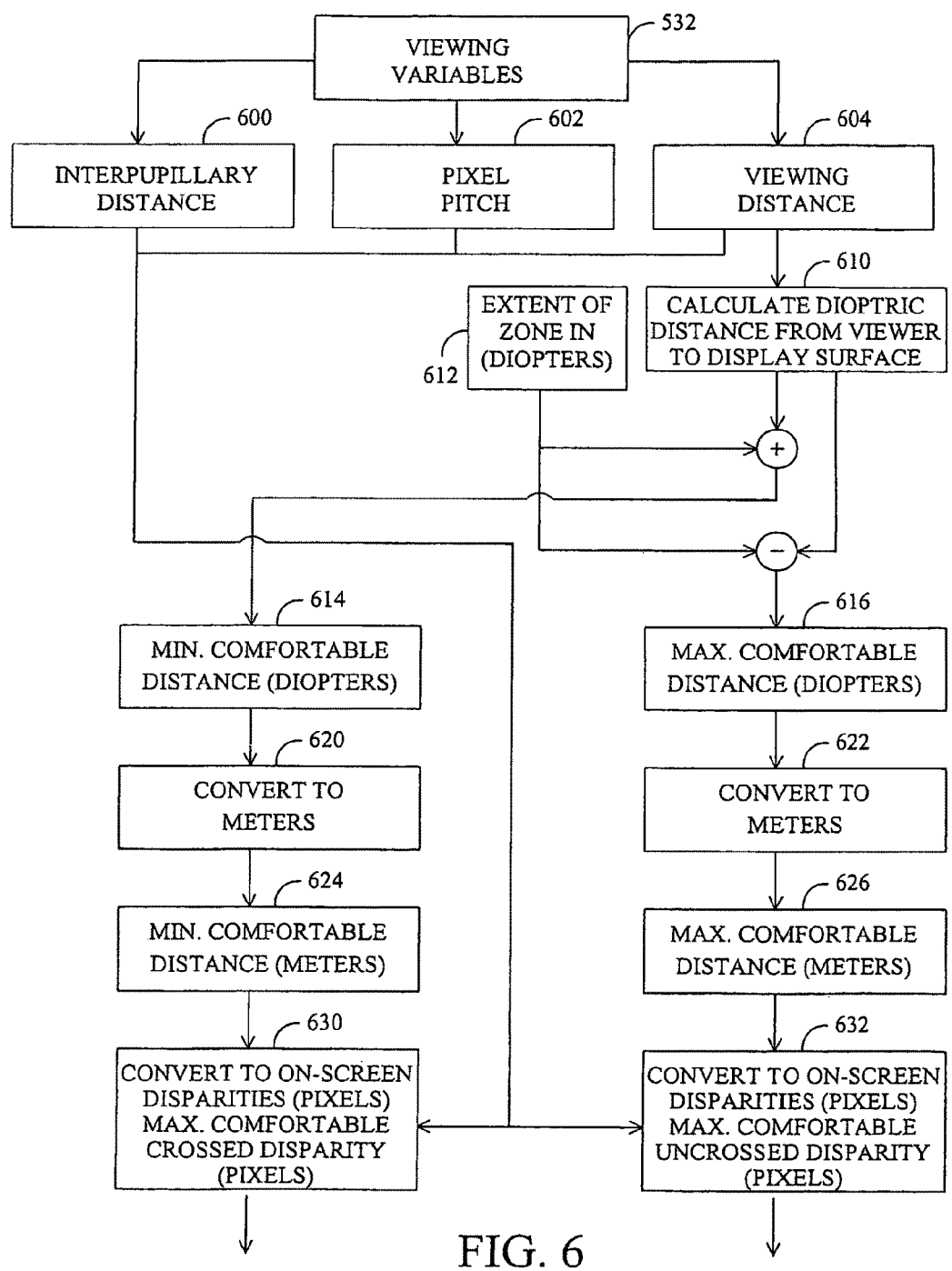
FIG. 6 illustrates calculating disparities within a zone.

The calculation of the maximum crossed and uncrossed disparities 534 may be determined using any suitable technique. Referring to FIG. 6, one technique to calculate the disparities 534 includes setting the viewing variable 532 which may include the interpupillary distance 600, the pixel pitch 602, and/or the viewing distance 604. The viewing distance 604 is used to calculate dioptric distance from viewer to the display surface 610. Based upon the zone of comfort 612 (see FIG. 4) and the dioptric distance 610, the minimum comfortable distance 614 is determined. Based upon the zone of comfort 612 (see FIG. 4) and the dioptric distance 610 the maximum comfortable distance 616 is determined. The minimum distance 614 and the maximum distance 616 may be considered the crossing points in the zone of FIG. 4. The distances 614 and 616 are converted to meters 620, 622 resulting in distances 624, 626.

Based upon the viewing variables 532, the minimum distance 624, and the maximum distance 626, a maximum comfortable crossed disparity 630 is determined (see 538 FIG. 5). Based upon the viewing variables 532, the minimum distance 624, and the maximum distance 626, a maximum comfortable uncrossed disparity 632 is determined (see 536 FIG. 5). The disparities 630 and 632 may be dynamically generated or calculated off-line.

Figure 7:
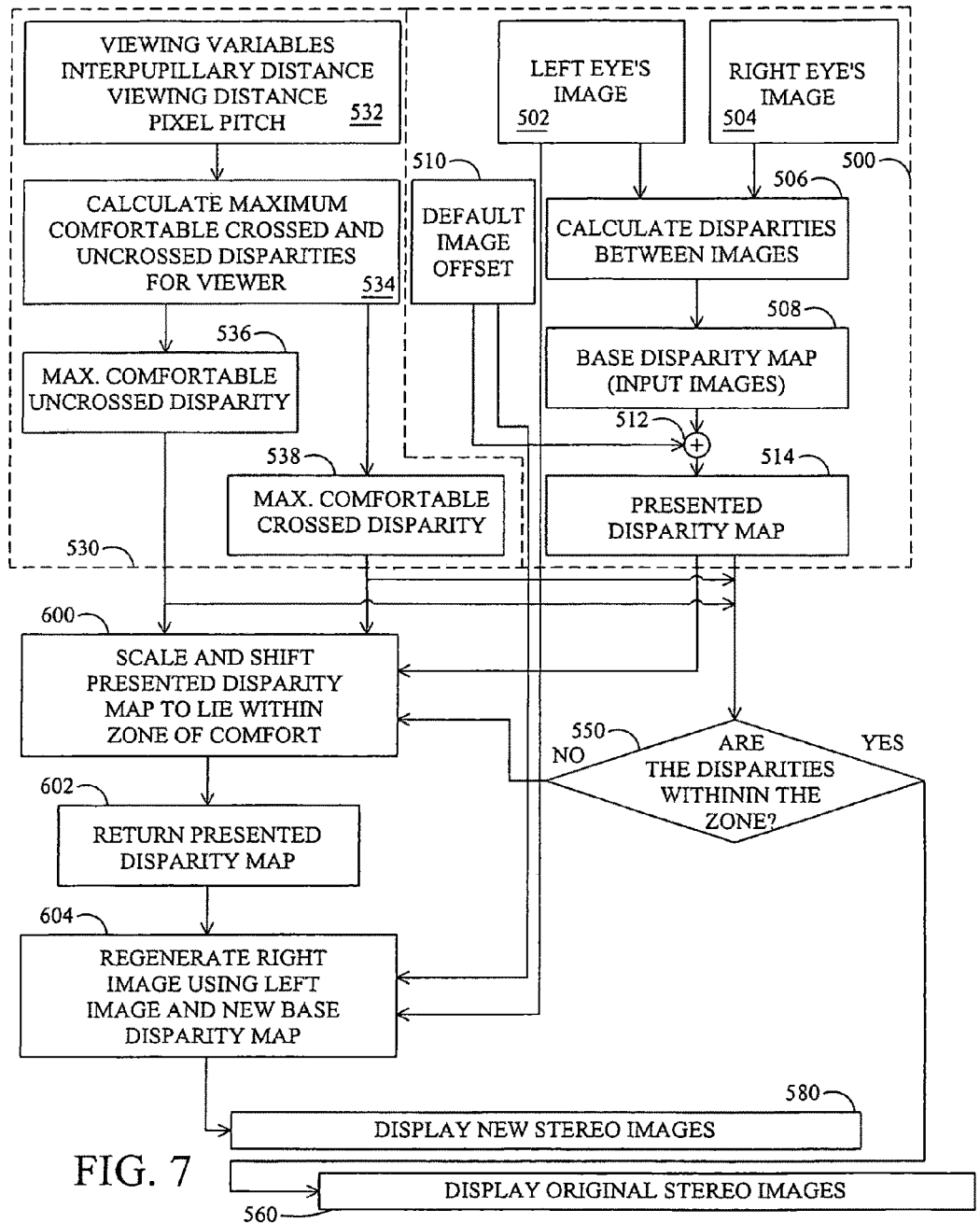
FIG. 7 illustrates a technique for image synthesis.

Referring to FIG. 7, while shifting all or different regions of an image may be suitable to reduce the disparities, another technique may involve the synthesis of a new left image (or portions thereof), a new right image (or portions thereof), or both (or portions thereof). If the disparities are not substantially within the zone of comfort 550, then the system scales and shifts the presented disparity map to lie substantially within the zone 600. The scaled and shifted map 600 then results in a returned presented disparity map 602. Based upon the disparity map 602, the default image offset 510, and the left eye image 502, the system may generate a new right image 604. The resulting images are displayed 580 on the display.

One technique for computing the image offset is to determine the offset that minimizes the accumulated magnitude of discomfort for all image pixels. Let D denote the current viewing distance, $\Delta d$ the expected image offset, and $d_i$ the disparity for pixel i. The magnitude of discomfort for each pixel, $m(D, d_i)$, is computed from look-up table (See FIG. 4). $m(D, d_i)$ is zero if the disparity is inside the PZC and becomes a positive value if the disparity is outside the PZC.

The image offset is selected such that the sum of magnitude of discomfort is minimized:

$$\sum_i m(D, d_i + \Delta d)$$

The minimization problem can be solved by an exhaustive search of the image offset $\Delta d$ on a uniformly sampled range. For example, if the total range of image offset is set to [0, 20], the minimization technique picks the possible values from 0, 1, 2, ..., up to 20 and computes the summed magnitude of discomfort. The offset value that achieves the minimal summed magnitude of discomfort is selected as the optimal image offset.

Figure 8:
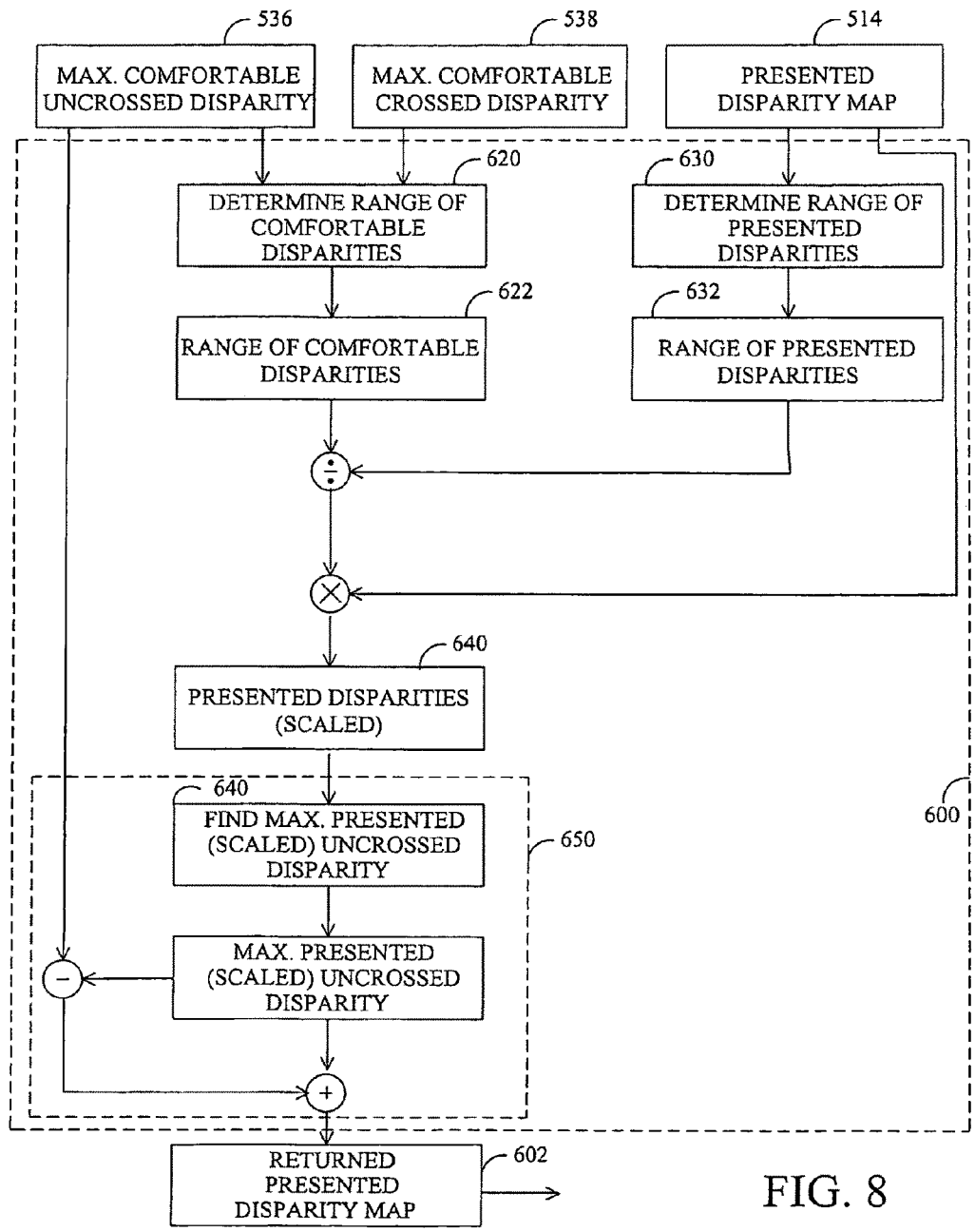
FIG. 8 illustrates shifting and scaling of a disparity map.

Referring to FIG. 8, the scale and shift disparity map 600 may be done in any suitable manner. One technique involves determining the range of comfortable disparities 620 based upon the max comfortable uncrossed disparity 536 and the maximum comfortable crossed disparity 538. Based upon determining the range 620 a range of comfortable disparities 622 is identified. Also, a range of presented disparities 630 is determined based upon the presented disparity map 514. Based upon the determining the presented range 630, a range of presented disparities 632 is identified. The range of comfortable disparities 622 is divided by the range of presented disparities 632, and the quotient is multiplied by the original disparity map. The result is a scaled version of the disparity map 640. This modifies the shape of objects mostly in the form of a depth compression. Next the system shifts the scaled disparity map so that substantially all of the disparities are within the zone. This is performed by determining the difference between the maximum comfortable uncrossed disparity and the maximum scaled uncrossed disparity, and adding that value to each disparity in the scaled disparity map 650. The result is a returned disparity map, where substantially all values lie with the zone.

Figure 9:
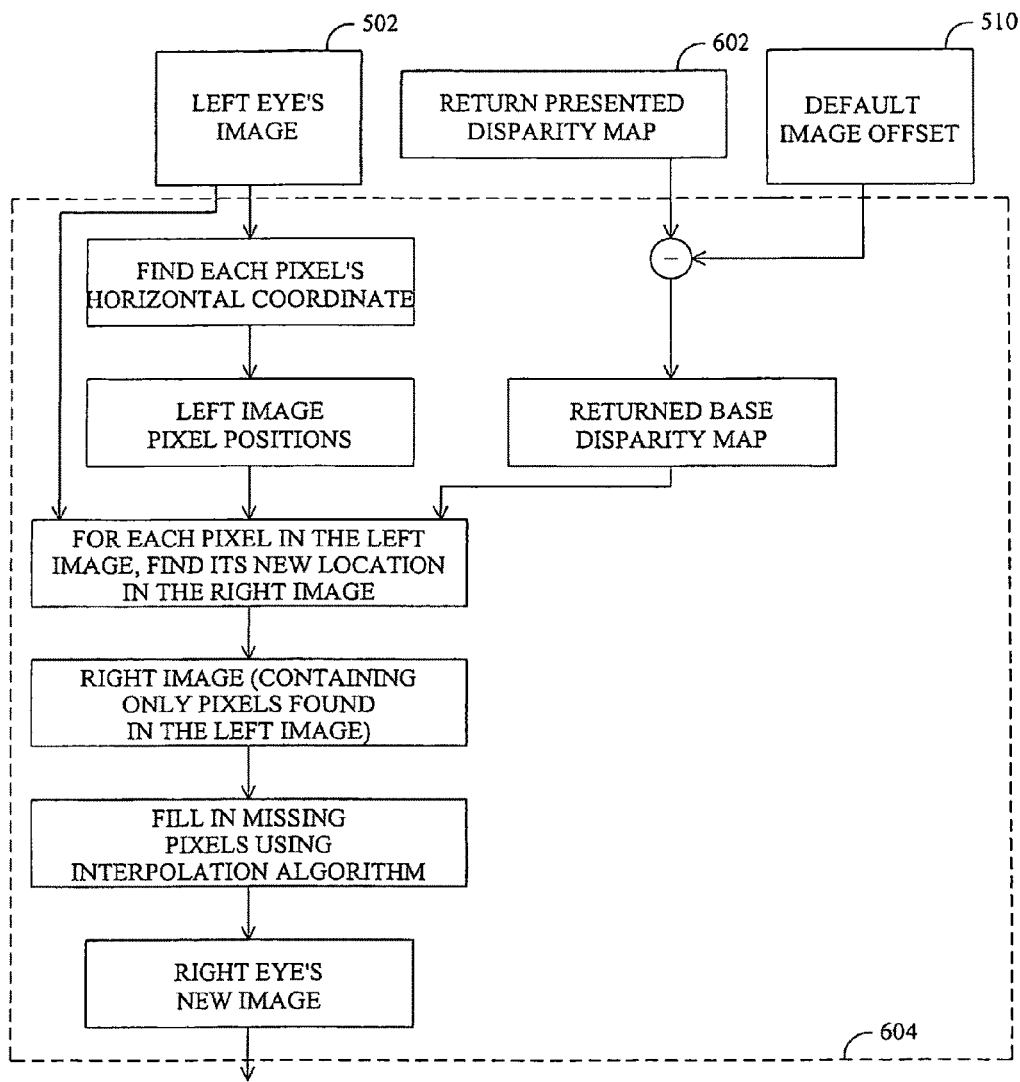
FIG. 9 illustrates the synthesis of a new right image.

Referring to FIG. 9, the regenerate 604 technique may be done in any suitable manner. One techniques involves the image offset being subtracted from the retuned disparity map to produce the retuned base disparity map. This refers to the disparity map that would correspond to the left and right images if no image offset were used. The retuned base disparity map is used with the horizontal coordinates for each pixel in the left image to determine the position of those pixels in the right image. There will be regions in the right image where pixel information is missing. An occlusion-filling algorithm may be used to fill in those missing regions, resulting in the new right image.

Once the new right image is synthesized, it is sent along with the original left image and the previously determined image offset value to the display. It should be noted that for illustrative purposes one assumed the left image was used to reconstruct the right image. The roles of the left and right images can be reversed in the process detailed above. In addition, both images may be reconstructed if desired.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for modifying images for display on a three dimensional display comprising:
    (a) receiving a first image and a corresponding second image which together represent a three dimensional image when displayed on said three dimensional display;
    (b) determining based upon said first image and said second image whether their content is expect to cause substantial discomfort to a viewer when displayed on said three dimensional display;
    (c) modifying at least one of said first image and said second image, based at least in part on a physical value provided together with said display corresponding with the pixel pitch of said display, in such a manner to reduce the expected said discomfort to said viewer.

2. The method of claim 1 wherein said substantial discomfort is based upon a zone of comfort.

3. The method of claim 2 wherein said zone of comfort has a depth of focus no greater than around 0.66 diopters.

4. The method of claim 2 wherein said zone of comfort is a Percival zone of comfort.

5. The method of claim 2 wherein said zone has disparity having a generally v-shape on a disparity as measured at screen surface versus viewer-to-screen distance, further including a cropping at substantial observer-to-screen distances.

6. The method of claim 1 wherein said modifying is based upon an image offset.

7. The method of claim 6 wherein said discomfort is based upon a spatial shift of pixels in the image space.

8. The method of claim 7 wherein said discomfort is mapped from diopter space to pixel disparity space as a disparity map representing spatial shifts of the pixels in said image space.

9. The method of claim 8 further including an offset applied to said disparity map for a majority of the pixels.

10. The method of claim 9 wherein a viewing variable determination for said modification is based upon at least one of interpupillary distance, a viewing distance from said display, and a pixel pitch of said display.

11. The method of claim 10 wherein said at least one is viewer variable is adjustable.

12. The method of claim 10 wherein a maximum comfortable crossed disparity is determined and a maximum comfortable uncrossed disparity is determined based upon said viewing variable determination.

13. The method of claim 10 wherein said viewing distance is adjustable by a viewer.

14. The method of claim 1 wherein said modifying is based upon a maximum comfortable crossed disparity, a maximum comfortable uncrossed disparity, and a disparity map.

15. The method of claim 14 wherein said modification is based upon an image shift of said first and second images toward one another.

16. The method of claim 14 wherein said modification is based upon an images shift of said first and second images away from one another.

17. The method of claim 14 wherein said modification is based upon a moving part of said first and second images away from one another, and moving part of said first and second images toward one another.

18. The method of claim 17 wherein said modification is based upon a scaling of a disparity map.

19. The method of claim 1 wherein said modifying is based upon scaling and shifting a disparity map.

20. The method of claim 19 wherein said modifying recomputing at least one of said first image and said second image based upon said disparity map.

21. The method of claim 1 wherein said modifying is based upon regenerating a new at least one of said first image and said second image.

22. The method of claim 21 wherein said modifying is based upon regenerating only one of said first image and said second image.

23. The method of claim 1 wherein said substantial discomfort is based upon a zone bounded generally by a first boundary based on near distance accommodation, a second boundary based upon diverging eyes, a third boundary based upon cross disparities blur diopter distance in front of the screen, and a fourth boundary based upon uncrossed disparities blur diopter distance behind the screen.

* * * * *